(12) United States Patent
Sakaranaho et al.

(10) Patent No.: US 12,508,603 B2
(45) Date of Patent: Dec. 30, 2025

(54) HYDROCYCLONE FOR DETECTING FORMATION OF A ROPING STATE

(71) Applicant: Metso Outotec Finland Oy, Tampere (FI)

(72) Inventors: Matti Sakaranaho, Oulu (FI); Teemu Soini, Kuopio (FI); Jari Kourunen, Kuopio (FI); Jani Kaartinen, Kuopio (FI); Janne Loimi, Helsinki (FI); Kari Heiskanen, Helsinki (FI)

(73) Assignee: Metso Finland Oy, Espoo (FI)

( * ) Notice: Subject to any disclaimer, the term of this patent is extended or adjusted under 35 U.S.C. 154(b) by 946 days.

(21) Appl. No.: 17/421,831

(22) PCT Filed: Jan. 11, 2019

(86) PCT No.: PCT/FI2019/050020
§ 371 (c)(1),
(2) Date: Jul. 9, 2021

(87) PCT Pub. No.: WO2020/144394
PCT Pub. Date: Jul. 16, 2020

(65) Prior Publication Data
US 2022/0097082 A1    Mar. 31, 2022

(51) Int. Cl.
*B04C 11/00* (2006.01)
*B04C 5/14* (2006.01)
*G01N 27/10* (2006.01)

(52) U.S. Cl.
CPC .............. *B04C 11/00* (2013.01); *B04C 5/14* (2013.01); *G01N 27/10* (2013.01)

(58) Field of Classification Search
CPC ............ B04C 11/00; B04C 5/14; G01N 27/10
See application file for complete search history.

(56) References Cited

U.S. PATENT DOCUMENTS 6,983,850 B2 * 1/2006 Olson ................ B04C 11/00
210/85
2005/0016903 A1    1/2005 Olson et al.
(Continued)

FOREIGN PATENT DOCUMENTS

AU    2015202405 A1 *  5/2015 ............. B04C 11/00
CN    102947006 A     2/2013
(Continued)

OTHER PUBLICATIONS

Bond et al. (Industrial Monitoring of Hydrocyclone Operation using Electrical Resistance Tomography, 1st World Congress on Industrial Process Tomography, 1999, pp. 102-107). (Year: 1999).*
(Continued)

*Primary Examiner* — Youngsul Jeong
(74) *Attorney, Agent, or Firm* — Andrus Intellectual Property Law, LLP (57) ABSTRACT

A hydrocyclone for separating feed into overflow and underflow comprises a feed inlet, an overflow outlet, an apex for discharging underflow, an upper section connected to the feed inlet and the overflow outlet, a conical section between the upper section and the apex and a plurality of electrodes for measuring electrical conductivity inside the hydrocyclone to detect the formation of a roping state in the hydrocyclone. The plurality of electrodes are is positioned circumferentially in the conical section on an axial distance from the apex ($d_{meas}$); wherein $d_{meas}$ is at least 5 percent of the axial distance between the apex and the upper section, and $d_{meas}$ is at most 50 percent of the axial distance between the apex and the upper section.

11 Claims, 6 Drawing Sheets

(56) References Cited

U.S. PATENT DOCUMENTS

2012/0209550 A1    8/2012  Van Der Spek et al.
2018/0010945 A1    1/2018  Maron et al.

FOREIGN PATENT DOCUMENTS

| WO | 200027539 | 5/2000 | | |
|---|---|---|---|---|
| WO | 2018029574 | 2/2018 | | |
| WO | WO-2019126393 A1 * | 6/2019 | ............. | B04C 5/085 |

OTHER PUBLICATIONS

Gnecchi et al. (Evaluation of Methods for On-line Image Analysis of Electrical Impedance Tomography Images, 2007, Electronics, Robotics and Automotive Mechanics Conference 2007, NJ, USA) (Year: 2007).*
European Search Report for European Application No. 19908422.9 mailed Jul. 21, 2022.
International Search Report and Written Opinion for International Application No. PCT/FI2019/050020 mailed May 8, 2019.
International Preliminary Report on Patentability for International Application No. PCT/FI2019/050020 mailed Nov. 19, 2020.
Bond, J. Industrial Monitoring of Hydrocyclone Operation using Electrical Resistance Tomography. In: 1st World Congress on Industrial Process Tomography, Apr. 14-17, 1999, International Society for Industrial Process Tomography, 1999, pp. 102-107, ISBN 978-0-85316-317-6.
Gnecchi, J. A. G. et al. Evaluation of Methods for ON-line Image Analysis of Electrical Impedance Tomography Images. In: Electronics, Robotics and Automotive Mechanics Conference 2007, NJ, USA: IEEE, Sep. 1, 2007, pp. 283-288, ISBN 978-0-7695-2974-5.
Office Action and Search Report for Chinese Patent Application No. 2019800938605, dated May 6, 2023.

* cited by examiner

HYDROCYCLONE FOR DETECTING FORMATION OF A ROPING STATE

CROSS-REFERENCE TO RELATED APPLICATIONS

This application is the U.S. national stage application of International Application PCT/FI2019/050020, filed Jan. 11, 2019, which international application was published on Jul. 16, 2020, as International Publication WO 2020/144394 A1 in the English language.

FIELD

The present disclosure relates to hydrocyclones. In particular, the disclosure relates to a device and a method for detecting the formation of a roping state in a hydrocyclone by measuring electrical conductivity inside the hydrocyclone.

BACKGROUND

Hydrocyclones are classification devices used to separate feed material such as mixtures of minerals. They are often used in clusters so that large amounts of feed material can be divided into several hydrocyclones for classification. Hydrocyclones utilize centrifugal force to accelerate the settling rate of particles, causing the formation of an air core, which is essential to the operation of the hydrocyclone. However, hydrocyclones suffer from a condition known as roping, where the air core collapses, when the capacity of an individual hydrocyclone is exceeded.

Imperfect detection for roping encumbers the operation of hydrocyclones, for example by reducing the operating time of an individual hydrocyclone and increasing the number of hydrocyclones required to maintain any given capacity for a cluster of hydrocyclones.

OBJECTIVE

An objective is to eliminate or alleviate at least some of the disadvantages mentioned above.

In particular, it is an objective to provide a hydrocyclone and a method, which can be used to more accurately detect the formation of a roping state in the hydrocyclone. A further objective is to provide a hydrocyclone, the construction of which allows to detect the formation of a roping state before the roping state has emerged so that the operation of the hydrocyclone can be adjusted to prevent the roping state from emerging.

SUMMARY

A hydrocyclone (below also "cyclone") is a classification device for separating feed material, for example based on differences in size and/or specific weight of particles in the feed material. Alternatively or in addition, the separation can also take place based on the shape of the particles. The feed rate is the rate with which the feed material is introduced into the hydrocyclone. The feed material (below also "feed") can be, for example, slurry. The feed may comprise solid matter such as mineral particles. It may also comprise carrier fluid such as water. For example, it has been found that the present disclosure may provide improved roping detection when the weight of solid matter in the feed corresponds to 10-85 percent of the total weight of the feed, i.e. the feed has a solid matter content of 10-85 percent. As another example, it has been found that the present disclosure may provide improved roping detection when the specific weight of the solid matter is 1.5-7.0 tonnes per cubic meter.

The feed can be separated, at least, into overflow and underflow, the former of which corresponds to fine product and latter of which corresponds to coarse product. The fine product may comprise, at least on average, smaller particles and/or particles having smaller specific weight than the particles in the coarse product. A cut-size is defined with cut-size particles having an equal probability to enter either the fine or the coarse product. The axial dimension of the hydrocyclone is defined as the dimension corresponding to the height dimension of the cyclone. Correspondingly, the axial dimension may hereby be expressed also as the vertical dimension. By onset of the roping state, it is meant here the moment when the hydrocyclone switches to the roping state. By formation of the roping state, it is meant here any of the processes that relate to the hydrocyclone switching to the roping state. By definition, these can be identified before and/or after the onset of the roping state. By determining the formation of the roping state, it is meant here a determination that a switch to the roping state has taken place or is to be expected.

According to a first aspect, a hydrocyclone for separating feed into overflow and underflow comprises a feed inlet. This allows feed material to be introduced into the cyclone. The hydrocyclone also comprises an overflow outlet to allow extracting overflow from the cyclone and an apex for discharging underflow from the cyclone. The hydrocyclone further comprises an upper section connected to the feed inlet and the overflow outlet and a conical section between the upper section and the apex. This structure allows the centrifugal force to separate the feed inside the cyclone. The hydrocyclone may be arranged to function as part of a cluster of hydrocyclones. This allows large amounts of feed material to be divided into several hydrocyclones for classification.

For measuring electrical conductivity inside the hydrocyclone to detect the formation of a roping state in the hydrocyclone, the hydrocyclone comprises a plurality of electrodes. However, while simply including measurement electrodes and measuring electrical conductivity within the hydrocyclone at suitable locations may be used to detect roping after the onset of the roping state, it has been found out that the detection accuracy can be notably improved with selective positioning of the electrodes. Consequently, in the disclosed hydrocyclone the plurality of electrodes is positioned circumferentially in the conical section on an axial distance from the apex ($d_{meas}$); wherein $d_{meas}$ is at least 5 percent of the axial distance between the apex and the upper section, and $d_{meas}$ is at most 50 percent of the axial distance between the apex and the upper section. In effect, the axial distance between the apex and the upper section may correspond to the height of the conical section. The placement of the electrodes as defined above has been found to allow notable improvement in the measurement accuracy specifically for roping detection, which may further allow the onset of the roping state to be determined in advance or that a switch to the roping state is to be expected. It is noted that improved accuracy can correspond to improved probability for providing a correct determination at any given time, before or after the onset of the roping state, whether the roping state has actually emerged. Alternatively or in addition, the improved accuracy can correspond to being able to determine, with full or threshold certainty, at an earlier moment that the roping state has emerged or is going to emerge as the cyclone is in operation.

It is emphasized that while the emergence of the roping state can also be observed by other devices included in the hydrocyclone to detect roping and/or even directly by visual inspection, the roping detection in accordance with the present disclosure may be pre-emptive. This is in contrast to methods and devices which can only determine the occurrence of a roping state after it has already emerged or when it is too late to prevent it from emerging. In the context of this disclosure, it is noted that roping is not an easily reversible phenomenon but has a large hysteresis. With non-pre-emptive detection, the hydrocyclone may need to be removed from operation for an extended period of time to restore the air core, after the roping state has been detected. While this shortcoming may be circumvented by including one or more reserve hydrocyclones in a cluster of hydrocyclones, the pre-emptive detection may both reduce the number of required hydrocyclones in the cluster and increase the operating time of the cluster. While the one or more reserve hydrocyclones can be used to maintain the overall capacity of the cluster, even when one or more of the hydrocyclones are temporarily out of operation after roping has been detected in them, the interruption to normal operation may reduce the operating time of the cluster, for example due to the required rerouting of the feed.

For pre-emptive roping detection in accordance with the present disclosure, an upcoming switch to the roping state may be determined before the onset of the roping state. This may also mean that the upcoming switch to the roping state is determined a threshold reaction time before the onset of the roping state, where the threshold reaction time is long enough for the operation of the hydrocyclone to be adjusted to prevent the switch to the roping state, for example by lowering the feed rate of the cyclone.

The hydrocyclone may comprise or be connectable to one or more controllers configured to perform the measurement and/or determine the formation of the roping state. The measurement and/or the detection may be arranged to be performed automatically.

In an embodiment, the plurality of electrodes comprises at least nine electrodes. It has been found that this minimum number of electrodes can be used to produce a mapping of two or more dimensions, the mapping being suitable for roping detection and thereby allowing the detection accuracy to be further improved particularly for roping detection. The plurality of electrodes may be arranged for electrical resistance tomography (ERT) and/or electrical impedance tomography (EIT) mapping.

In an embodiment, the thickness of the electrodes in the plurality of electrodes is at least 2.5 millimeters. This has been found to improve detection accuracy particularly for roping detection.

In an embodiment, the plurality of electrodes is positioned within an annular gasket. This allows various effects such as easier and more reliable installation, improved protection of the electrodes and, consequently, also potentially improved detection accuracy and reliability. In a further embodiment the gasket is of rubber or insulating polymer allowing both electrical insulation and resilient coupling with the conical section of the hydrocyclone for liquid-proof contact. In another further embodiment, the conical section is divided in separate upper part and lower part in the axial dimension and the gasket is clamped between the upper part and the lower part. This allows accurate and easy positioning of the plurality of electrodes. In a yet another further embodiment the thickness of the gasket is at least 5 millimeters. This allows the gasket to accommodate electrodes having thickness of about 3 millimeters, e.g. 3 millimeters plus or minus 0-1 millimeters, while maintaining a reliable insulating layer across the electrodes. In one more further embodiment, the outer circumference of the gasket comprises an extension for each of the electrodes in the plurality of electrodes. This allows the gasket to be fixed in the hydrocyclone between the electrodes while extending the protection provided by the gasket to the electrodes. The extensions can be separate for each of the electrodes or two or more electrodes can share an extension.

According to a second aspect, a method for measuring electrical conductivity within a hydrocyclone to detect the formation of a roping state in the hydrocyclone is disclosed. The hydrocyclone comprises a feed inlet, an overflow outlet, an apex for discharging underflow, an upper section connected to the feed inlet and the overflow outlet and a conical section between the upper section and the apex. Any or all features described above in relation with the first aspect may be considered to relate also to the hydrocyclone of the second aspect. The method comprises measuring electrical conductivity inside the hydrocyclone with a plurality of electrodes positioned circumferentially in the conical section on an axial distance from the apex ($d_{meas}$), wherein $d_{meas}$ is at least 5 percent of the axial distance between the apex and the upper section, and $d_{meas}$ is at most 50 percent of the axial distance between the apex and the upper section. The measurement is performed to detect the formation of a roping state in the hydrocyclone. Detection of the formation of the roping state can also be performed in a separate step, for example by a separate apparatus. The measurement and/or the detection may be determined by a controller that is part of the hydrocyclone. Either or both of the steps can also however be performed by a controller separate from the hydrocyclone, while the cyclone may be arranged to be connected or connectable to such a controller. The measurement and/or the detection may be arranged to be performed automatically.

The detection can be performed pre-emptively, as described above.

When the formation of the roping state has been detected, before and/or after the onset of the roping state, an alarm can be generated. Alternatively or in addition, the operation of the hydrocyclone can be controlled to prevent or remove the roping state, for example by reducing the feed rate into the hydrocyclone.

Feed is introduced into the hydrocyclone through one or more feed inlets. The feed may consist of solid matter and carrier fluid. During operation of the hydrocyclone, material corresponding to the feed is separated for example based on differences in size and/or specific weight of particles in the feed. When electrical conductivity is measured inside the hydrocyclone, the material corresponding to the feed, from which the electrical conductivity is measured, may already be fully or partially separated.

In an embodiment, the weight of solid matter in the feed introduced into the hydrocyclone corresponds to 10-85 percent of the total weight of the feed. Correspondingly, the weight of carrier fluid in the feed may correspond to 15-90 percent of the total weight of the feed.

In an embodiment, the solid matter in the feed introduced into the hydrocyclone has specific weight of 1.5-7.0 tonnes per cubic meter.

It is to be understood that the aspects and embodiments described above may be used in any combination with each other. Several of the aspects and embodiments may be combined together to form a further embodiment.

BRIEF DESCRIPTION OF THE DRAWINGS

The accompanying drawings, which are included to provide a further understanding and constitute a part of this specification, illustrate embodiments and together with the description help to explain the principles of the invention. In the drawings.

Like references are used to designate equivalent or at least functionally equivalent parts in the accompanying drawings.

DETAILED DESCRIPTION

The detailed description provided below in connection with the appended drawings is intended as a description of the embodiments and is not intended to represent the only forms in which the embodiment may be constructed or utilized. However, the same or equivalent functions and structures may be accomplished by different embodiments.

A hydrocyclone (below also "cyclone") is a piece of process equipment adapted to classify feed, such as slurry, in large volumes. Depending on the size of the cyclone the flow rates may even exceed a cubic meter of feed per second, while typical values range from 25 cubic centimeters per second to 2 cubic meters per second. Examples of construction and operation of a hydrocyclone are disclosed, for example, in Wills' Mineral Processing Technology $8^{th}$ edition (Chapter 9.4).

Figure 1:
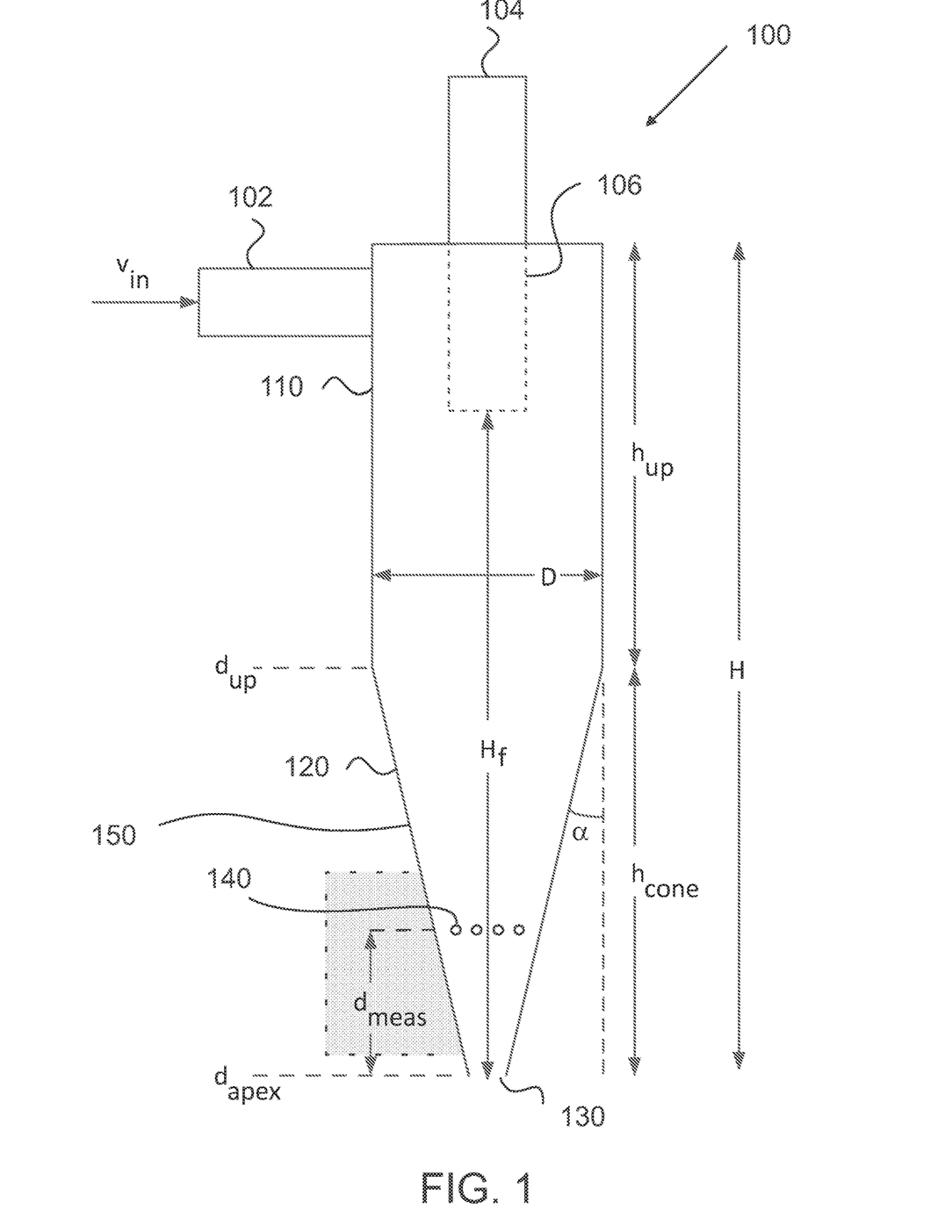
FIG. 1 is a schematical illustration of a hydrocyclone according to an embodiment in a side view.

FIG. 1 schematically illustrates a hydrocyclone 100 according to an embodiment. The cyclone 100 is adapted to classify feed by separating it into underflow and overflow and it may further be adapted for specific purposes such as mineral processing. To introduce feed into the cyclone 100, the cyclone comprises a feed inlet 102, which may be convoluted. The feed inlet 102 may be adapted to minimize flow turbulence of the feed, for example by inclined flow direction and/or absence of sharp corners.

To remove overflow from the cyclone 100, the cyclone 100 comprises an overflow outlet 104, which may comprise or be formed of a pipe. The overflow outlet may comprise a vortex finder 106 extending into the cyclone 100. The vortex finder 106 can be removable. The overflow outlet 104, and in particular the vortex finder 106, may be located at the centre axis of the cyclone 100. The overflow outlet 104, and in particular the vortex finder 106, may extend into the cyclone 100 past the bottom edge of feed inlet 102 in the axial dimension.

To discharge underflow from the cyclone 100, the cyclone comprises an apex 130 (also known as spigot). The apex 130 typically faces downwards so that the underflow is discharged downwards from the cyclone 100. The apex 130 may be located at the centre axis of the cyclone 100. Typically, a hydrocyclone 100 comprises exactly one apex 130 and exactly one overflow outlet 104 but constructions involving multiple apexes 130 also exist. For such constructions a single feed inlet 102 and/or overflow outlet 104 may correspond to multiple apexes 130.

The hydrocyclone 100 comprises an upper section 110, which may be cylindrical or substantially cylindrical. However, in some embodiments it may be at least slightly inclined so that its overall shape can be considered conical.

Hydrocyclones 100 are produced for many different applications and, correspondingly, their sizes and measurements such as the height ($h_{up}$) of the upper section 110 may vary. While the diameter (D) of the upper section may also vary, in an embodiment particularly suitable for mineral processing the diameter can be 50-1400 mm. In general, smaller diameter corresponds to smaller cut size. An important parameter to define the shape of the upper section 110 is the shape factor ($h_{up}/D$), which can be, for example, 0.6-2. The upper section 110 extends down to the level $d_{up}$, of the bottom of the upper section 110. At this level, the upper section 110 may have an annular inner cross section in the plane perpendicular to the axial dimension.

The hydrocyclone 100 also a conical section 120 situated between the upper section 110 and the apex 130. The height ($h_{cone}$) of the conical section 120 may vary.

The conical section 120 is adapted to form a settling space for the feed introduced into the cyclone 100. In particular, the cyclone 100 is adapted for the underflow to settle in the conical section 120 so that it can be discharged from the apex 130. For this purpose, the conical section 120 narrows toward the apex 130 and the narrowing can be continuous. The conical section 120 may have one or more frustoconical segments. Each of these may also be narrowing towards the apex 130. The conical section 120 has an angle of inclination ($\alpha$) with respect to the axial dimension, which may be fixed or substantially fixed. However, in some embodiments the angle of inclination may change, continuously or discontinuously, along the axial dimension of the conical section 120. In either case, the angle may be, for example, 10-30 degrees. Larger angles may be used for coarser cut sizes, whereas smaller angles may be used for finer cut sizes. When the angle of inclination varies, it may be arranged to always have a larger angle above a smaller angle. It is noted that the angle of inclination refers to the slope on the inner surface of the cyclone 100, and the conical section 120, since this is the slope determining the operating characteristics of the cyclone 100. The conical section 120 is coupled to the upper section 110 to allow the feed introduced into the hydrocyclone to travel between the two sections. For this purpose, the conical section 120 and the upper section may be directly connected so that the conical section 120 continues directly downwards from the upper section 110. In this case, the total height (H) of the cyclone 100 can be expressed as $H=h_{up}+h_{cone}$.

Both the conical section 120 and the apex 130 can be comprised in a lower section 150 of the hydrocyclone 100. The lower section 150 can be coupled to the upper section 110 from below and it can be directly connected to the upper section 110. The upper section and/or the lower section 150 may be made of metal. Similarly, the conical section 120 can be made of metal.

The upper section 110 is connected to the feed inlet 102 so that feed can be introduced into the cyclone 100 and into the upper section 110 in particular. The feed inlet 102 may be connected tangentially to the upper section 110, allowing tangential entry of the feed, imparting swirling motion to the feed inside the cyclone 100. The cyclone 100 is adapted for the feed to be introduced under pressure through the feed inlet 102, and the velocity ($v_{in}$) of the feed at the inlet can be, for example, 2-10 m/s or 6-10 m/s for smaller cyclones 100.

The upper section 110 is also connected to the overflow outlet 104 for removing overflow from the cyclone 110 and from the upper section 110 in particular. Since the overflow outlet 104 typically extends into the upper section 110, e.g. as a vortex finder 106, the free height ($H_f$) of the cyclone 100 can be smaller than the total height (H) of the cyclone 100. For the embodiments of the invention, the free height may be advantageously expressed in relation to the diameter of the upper section 110, in which case the parameter $H_f/D$ can be, for example, 3-10. It is noted that the total height is measured from the apex 130 to the top of the upper section 110, as illustrated. Correspondingly, the free height is measured from the apex 130 to the bottom of the overflow outlet 104. It is further noted that the cyclone 100 may well extend also below the apex 130, for example as a skirt for directing underflow discharge. Moreover, while the apex 130 can be located at the narrowest opening for discharging the underflow from the cyclone 100 below the conical section 120, also this narrowest opening may extend vertically with constant width. Consequently, all measurements at the apex 130 are here defined at the level $d_{apex}$ corresponding to the top of the apex 130.

The operation of the cyclone 100 may be described as follows. In short, the cyclone 100 can be adapted to separate feed by using centrifugal force that is generated by the feed entering the cyclone 100 under pressure. The centrifugal force causes coarse particles to be 'slung' to the inner wall of the cyclone 100 while fine particles remain closer to the center of the cyclone. The overflow outlet 104, or the vortex finder 106, draws water and/or fine material to the overflow while coarse material makes its way out the apex 130 at the bottom of the cyclone 100.

The feed generates a complex flow pattern consisting of two spiralling paths and a radial path. The outer spiralling path at the inner wall of the cyclone 100 is spiralling towards the conical section 120 of the cyclone 100 and the inner spiralling part towards overflow outlet 104, e.g. the vortex finder 106. As the feed is introduced to the cyclone 100, a tangential flow inward will be formed. In that inwards flow the ratio of tangential force and the drag force induced to particles in the feed will dictate to which of the spiralling flows particles will end. The tangential force is related to the third power of particle characteristic measure (e.g. the mass of a particle) and the drag force only to the second power (e.g. cross-sectional area of the particle). Because of this, only fine particles will be transported inwards to the spiralling flow taking them to overflow outlet 104, or the vortex finder 106. Coarse particles will remain in the downward flow and be directed towards the apex 130. The inner rotational flow has two important features. The most inner part of the flow conserves the angle velocity. This causes a free gas liquid boundary to form (e.g. an air core). Consequently, the cyclone 100 is adapted for the air core to be formable in the axial dimension of the cyclone 100. This air core is essential to the operation of a cyclone 100. As long as the air core penetrates the whole cyclone 100 from the overflow outlet 104, or the vortex finder 106, to the apex 130 the operation of the cyclone 100 can be stable. The air core can then also be open to the apex 130. The flow velocities at the apex 130 are relatively high and the underflow can be formed as a conical spray.

When the cyclone 100 is fed with excessive amount of coarse material, it may overload. The maintaining of a constant angular velocity starts to require more and more energy since the mass of the rotating flow increases. As a result, the angular velocity decreases resulting in an unstable air core which starts to fluctuate. If the overloading persists, i.e. excessive amount of coarse material continues to be introduced into the cyclone 100, the air core may disappear from the bottom of the cyclone 100. At this point the cyclone 100 starts roping. Roping is a state where particle flow velocities are very much retarded and the underflow capacity decreases. This will change the rotational and radial flow patterns. The outcome is that coarse particles are introduced to the inner rotational flow and are subsequently taken to the overflow product. The cut size of the cyclone 100 becomes much coarser than in normal operation. The operational cut size can go up from well below 100 μm to over 200 μm when the feed comprises a high percentage of solids.

As the velocities are much retarded, roping is not an easily reversible phenomenon but has a large hysteresis. Consequently, returning the cyclone 100 to normal operation may require a major reduction in feed.

One characteristic of roping is low rotational speed and high percentage of solid material in the underflow. This makes the underflow appear as a rope coming out of the apex 130. Another characteristic of roping is an increase in the separation size and a decrease in the amount of fine material in the underflow. The apex 130 may have a threshold capacity so that when the threshold capacity is exceeded, the roping state may occur. In normal operation of the cyclone 100, the underflow sprays out of the apex, typically in a conical pattern. However, at the onset of the roping state the air core inside the apex 130 collapses so that the spiraling motion of the underflow is largely or totally lost. Roping can even lead to blockage of the cyclone 100. While cyclone blockage is rare, it may occur if large particles, small grinding media, or some other foreign object blocks the apex.

The hydrocyclone 100 comprises a plurality of electrodes 140, which are adapted to provide a measurement signal. To detect roping, the plurality of electrodes 140 is specifically adapted to measure electrical conductivity inside the cyclone 100 to detect the formation of a roping state in the cyclone 100. For this purpose, all the electrodes 140 in the plurality of electrodes 140 may be arranged at substantially the same level on the axial dimension of the cyclone 100. For example, they may be arranged within 1-5 cm from each other in the axial dimension. Moreover, the plurality of electrodes 140 is positioned circumferentially in the conical section 120. The electrodes 140 may be positioned substantially equidistantly along the circumference of the conical section 120. The electrodes may extend through the wall of the hydrocyclone 100, e.g. from the inner surface of the conical section 120 to the outer surface of the hydrocyclone 100. The plurality of electrodes 140 may comprise or be formed of conductive bolts. The plurality of electrodes 140 may comprise or be formed of metal. The electrodes 140 may be rigid. It has been found that when each of the plurality of electrodes has a thickness of 2-3 millimeters or more, the accuracy and reliability of the measurement can be notably improved. The plurality of electrodes 140 may be positioned substantially horizontally, i.e. perpendicularly with respect to the axial dimension. The plurality of electrodes 140 may comprise threads, for example for fastening the electrodes 140. Additionally or alternative, threads may be used for fastening conductors to the electrodes 140 for transmitting the measurement signal from the electrodes 140. As an example, a conductor can be fastened between two threaded nuts on a threaded electrode 140.

Importantly, the plurality of electrodes 140 needs to be positioned on the axial dimension specifically so that its axial distance ($d_{meas}$) from the apex 130 is at least 5 percent of the axial distance between the apex 130 and the upper section 110, i.e. of the value $d_{up}-d_{apex}$. At the same time, $d_{meas}$ has to be at most 50 percent of the value $d_{up}-d_{apex}$. When the upper section 110 and the conical section 120 are directly connected, the value $d_{up}-d_{apex}$ corresponds to the height of the conical section 120. The positioning of the electrodes within the aforementioned limits has been found to produce a notable improvement in the accuracy of roping detection, even to the degree that the electrodes 140 may be used to allow pre-emptive determination of the switch to the roping state. Once the plurality of electrodes 140 are positioned above the lower limit as described above, it has been found that the air core in typical measurement situations becomes markedly more robust for accurate measurement for detection of the formation of the roping state. On the other hand, it has been found that once the plurality of electrodes 140 is positioned above the upper limit as described above, in typical measurement situations the predictive effect is rapidly diminished. Correspondingly, positioning the electrodes 140 as described above allows the hydrocyclone 100 to be adapted for pre-emptive detection of the formation of the roping state.

It is noted that the cyclone 100 may comprise one or more sets of the plurality of electrodes 140, e.g. two, three or even more sets. Each of the sets may be arranged along the circumference of the conical section 120. The sets may be positioned remote to each other in the axial dimension. However, all the sets can still be arranged within the 5-50 percent of the value $d_{up}$-$d_{apex}$ from the apex 130, measured in the axial dimension. A plurality of electrodes 140 in a single set may be arranged at substantially the same level on the axial dimension of the cyclone 100. For example, they may be arranged within 1-5 cm from each other in the axial dimension.

The formation of the roping state can be determined by measuring the electrical conductivity with the equipment disclosed herein and associating the measured values with the formation of the roping state. For example, repeated measurements with the disclosed equipment can be made to identify patterns corresponding to the formation of the roping state. The formation of the roping state can be determined from the electrical conductivity measurements based on the fact that the presence of the air core creates a region within the cyclone 100, where the electrical conductivity is negligible or markedly diminished. Using the disclosed cyclone 100, patterns corresponding to the disappearance of the air core can be identified. Moreover, it has been found that when the plurality of electrodes 140 comprises nine or more electrodes, a sufficient resolution can be obtained for two-dimensional mapping of air core to detect the formation of the roping state. It has further been found that with twelve or more electrodes 140, the resolution can be further improved so that a notable improvement in both the accuracy and reliability of the measurement can be obtained.

As an example, Electrical Resistance Tomography (ERT) and/or Electrical Impedance Tomography (EIT) can be used to determine the formation of a roping state. These are process tomography techniques, which can be used for reliable on-line measurement of a multiphase environment. In ERT, an estimate of electrical conductivity of the target as a function of location can be calculated based on the measured voltages and the known injected currents (or vice versa). The computations are based on a mathematical model determining the relations between the currents, the electrical conductivity distribution within the hydrocyclone 100 and the voltages on the electrodes. Advantages of ERT are that it is based on a mathematical model which also takes into account electrode impedances and measurements can be done very fast. Consequently, plurality of electrodes may be adapted for imaging of the underflow of the cyclone 100 in real time.

EIT largely corresponds to ERT, except in that it utilizes both the resistance and the reactance of the measured signal and thereby the above also applies to EIT. The hydrocyclone 100, in particular the plurality of electrodes 140, may be adapted for either or both ERT and EIT measurement to detect the formation of a roping state in the hydrocyclone 100.

Regardless of the analysis techniques used, the plurality of electrodes 140 may be adapted to provide measurement signal to detect the formation of a roping state, for example by detecting whether there is an air core between the electrodes 140 or by detecting the size of the air core between the electrodes 140. Alternatively or in addition, the plurality of electrodes 140 may be adapted to provide measurement signal to detect whether the air core is about to disappear so that the emergence of the air core, and thus the roping state, can be pre-emptively detected. The plurality of electrodes 140 may be adapted to provide measurement signal for producing a two or more dimensional image of the underflow. The plurality of electrodes 140 may also be adapted to provide measurement signal from which it is possible to identify the characteristics of the apex 130 or where it is possible to visualize the air core on-line.

The measurement signal can be used to control the operation of the hydrocyclone 100. The measurement signal can for example, be used to produce an on-line warning for the operators of the cyclone 100 even before the roping state emerges. The measurement signal may be used for automated control of the cyclone 100, for example to automatically reduce the feed rate when the formation of a roping state has been detected.

This may be done, for example, when it is detected that the stability of the air core is lost already before roping takes place and the stability may be recovered without ever entering to the roping state. For analyzing the measurement signal and/or controlling the cyclone 100 based on the measurement signal, the cyclone 100 may be adapted to be connectable to a controller. In some embodiments, the cyclone 100 itself may even comprise a controller for analyzing the measurement signal and/or controlling the cyclone 100 based on the measurement signal. The controller may also be adapted to provide an alarm based on the measurement signal, for example when the formation of the roping state is detected before and/or after the onset of the roping state.

Figure 2A:
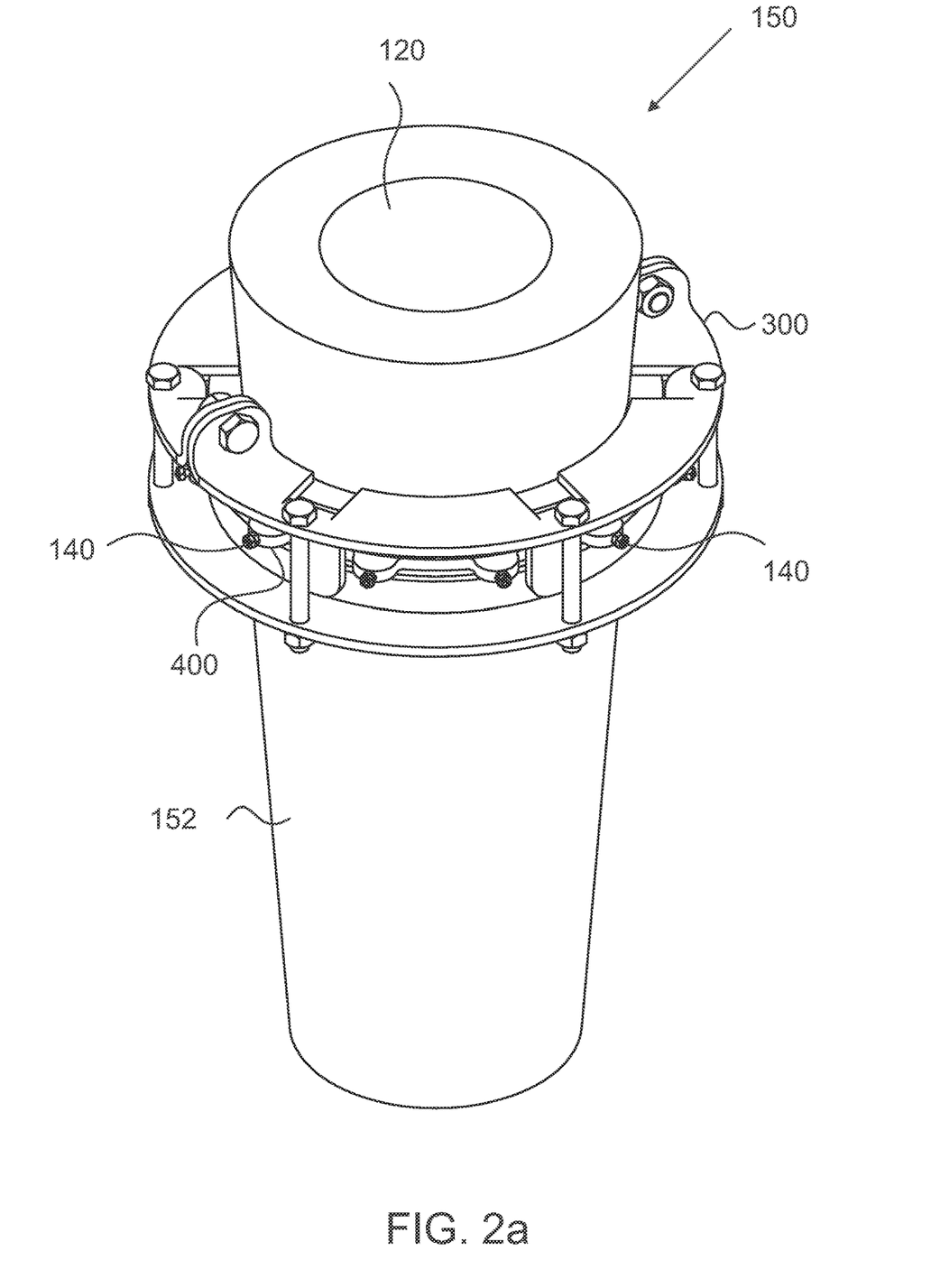
FIGS. 2a and 2b illustrate a lower section of a hydrocyclone according to an embodiment in a perspective view and in a side view, respectively.
Figure 2B:
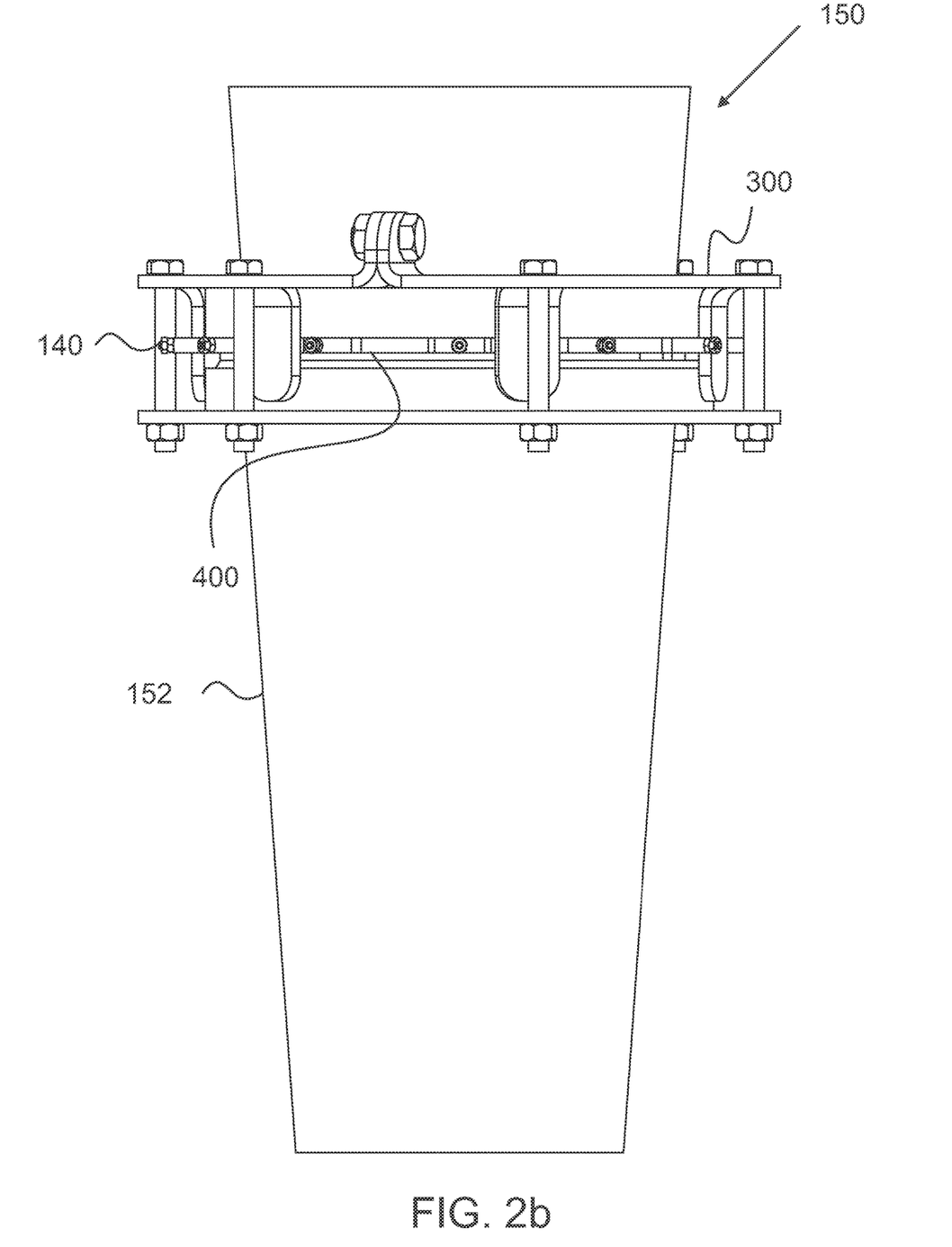
Figure 2C:
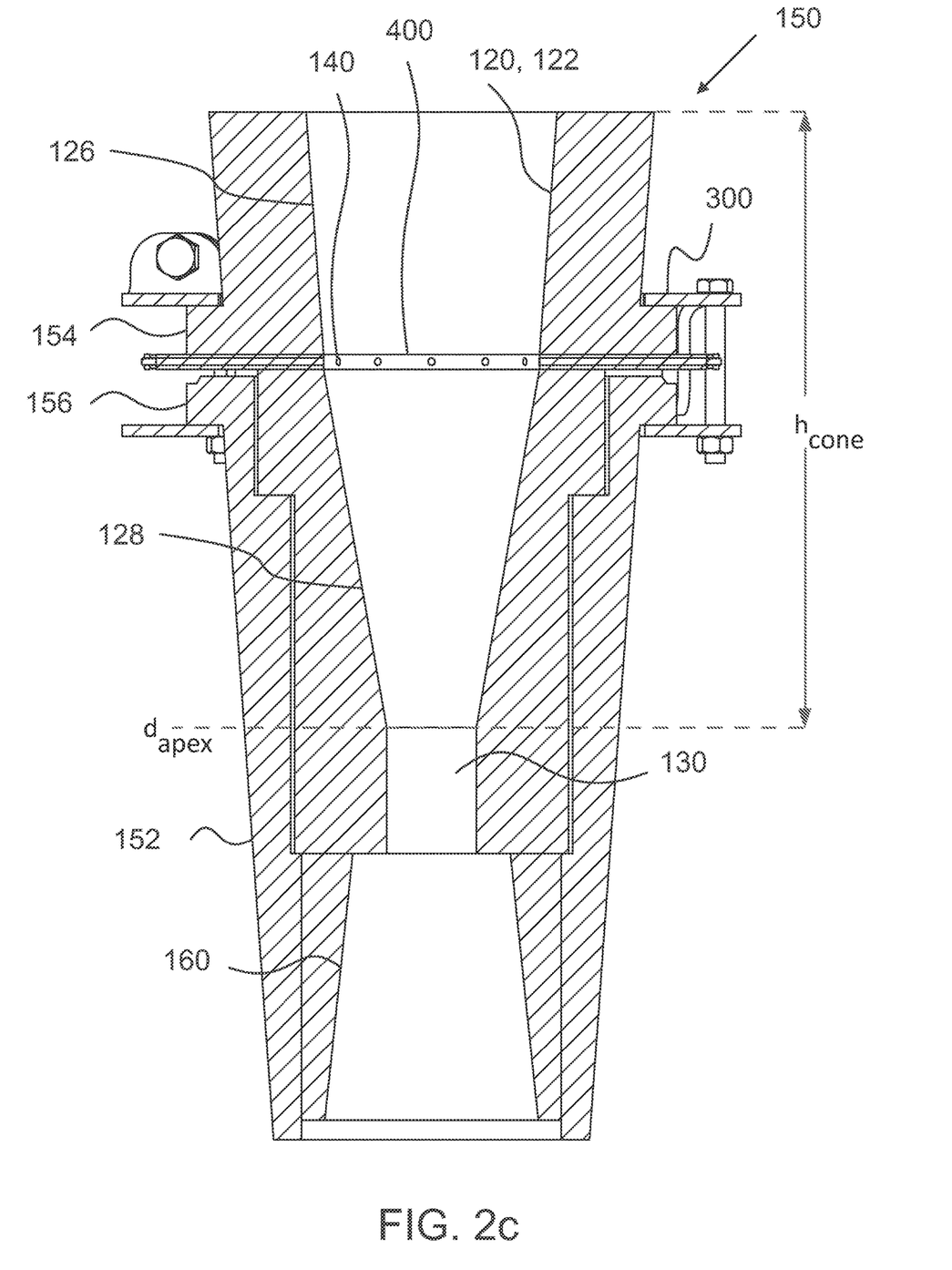
FIG. 2c illustrates a cross section of a lower section of a hydrocyclone according to an embodiment in a side view.

FIG. 2a-c illustrate a lower section 150 of a hydrocyclone 100 according to an embodiment. The lower section 150 comprises a conical section 120 and an outer surface 152. The outer surface 152 is also typically conical in that it may comprise one or more frustoconical segments. However, other shapes are naturally possible as well. The conical section 120 has an inner surface 122. The angle of inclination ($\alpha$) of the conical section 120, as described above, corresponds to the angle of inclination of the inner surface 122. As stated above, this angle may vary along the length of the conical section 120 or it may be fixed. The conical section 120 may be divided into two or more separate parts 126, 128 comprising one or more upper parts 126 and one or more lower parts 128 of the conical section 120. Likewise, the whole lower section 150 may be divided into two or more separate parts corresponding to the separate parts 126, 128 of the conical section 120. The plurality of electrodes 140 may be positioned between an adjacent pair of an upper part 126 and a lower part 128. To fasten the upper part 126 and the lower part 128 to each other, the cyclone 100 may comprise one or more clamps 300. The lower portion 150 may comprise one or more shoulders 154, 156 for supporting a clamp 300 for fastening the upper part 126 and the lower part 128 to each other. As an example, the lower portion 150 may comprise one or more shoulders 154 corresponding to the upper part 126 and/or one or more shoulders 156 corresponding to the lower part 128. The one or more shoulders 154, 156 may follow the outer surface 152 of the lower section 150 in the plane perpendicular to the axial dimension. The one or more shoulders 154, 156 may be annular. The one or more shoulders 154, 156 may extend, continuously or discontinuously, around the circumference of the lower section 150. The cyclone 100 may comprise a separate clamp 300 for each pair of an upper part 126 and a lower part 128. Moreover, a plurality of electrodes 140 between an adjacent pair of an upper part 126 and a lower part 128 may be positioned within a gasket 400. The gasket 400 may be clamped between the adjacent pair of an upper part 126 and a lower part 128 with a clamp 300.

As illustrated, the apex 130 may have a non-zero length in the axial dimension. The width of the apex 130 may remain constant along its length. The cyclone 100 may comprise a skirt 160 below the apex 130. The skirt 160 may be part of the lower section 150. The skirt 160 is adapted to direct the discharge of the underflow. The skirt 160 may be conical and it may comprise one or more frustoconical segments. The skirt 160 may be arranged to become wider, continuously or discontinuously, when moving away from the apex 130 in the axial dimension.

Figure 3:
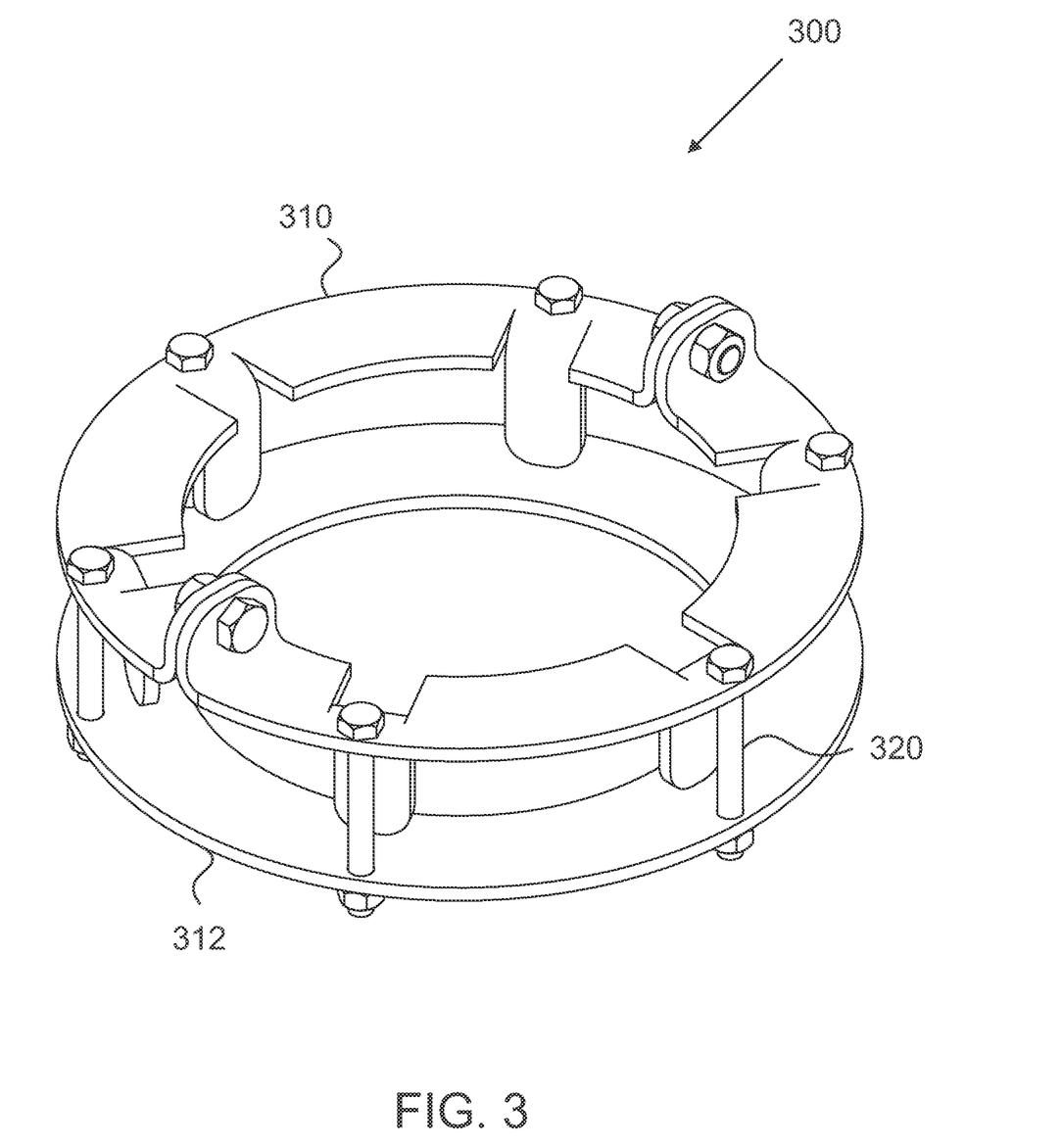
FIG. 3 illustrates a clamp of a hydrocyclone according to an embodiment in a side view.

FIG. 3 illustrates one example of a clamp 300 for fastening an upper part 126 and a lower part 128 of a conical section 120 to each other. The clamp 300 may comprise or be made of metal. The clamp 300 may be annular. The clamp 300 may comprise a collar 310, 312 for exerting clamping force on the lower section 150 of the cyclone 100, for example to a shoulder 154, 156. As an example, the clamp 300 may comprise one or more collars 310 for exerting clamping force on the side of the lower section 150 corresponding to the upper part 126 of the conical section 120 and/or one or more collars 312 for exerting clamping force on the side of the lower section 150 corresponding to the lower part 128 of the conical section 120. The one or more collars 310, 312 may be annular. The one or more collars 310, 312 may be adapted to extend, continuously or discontinuously, around the circumference of the lower section 150. The clamp 300 may comprise one or more fasteners 320, for example four or more, such as bolts for fastening the clamp 320. The one or more fasteners 320 may be arranged, for example, to fasten two collars 310, 312 to each other. The one or more fasteners 300 may be arranged for the clamping force to be exerted substantially in the axial dimension of the cyclone 100. The clamp 300 may be adapted for waterproof fastening of the conical section 120.

Figure 4A:
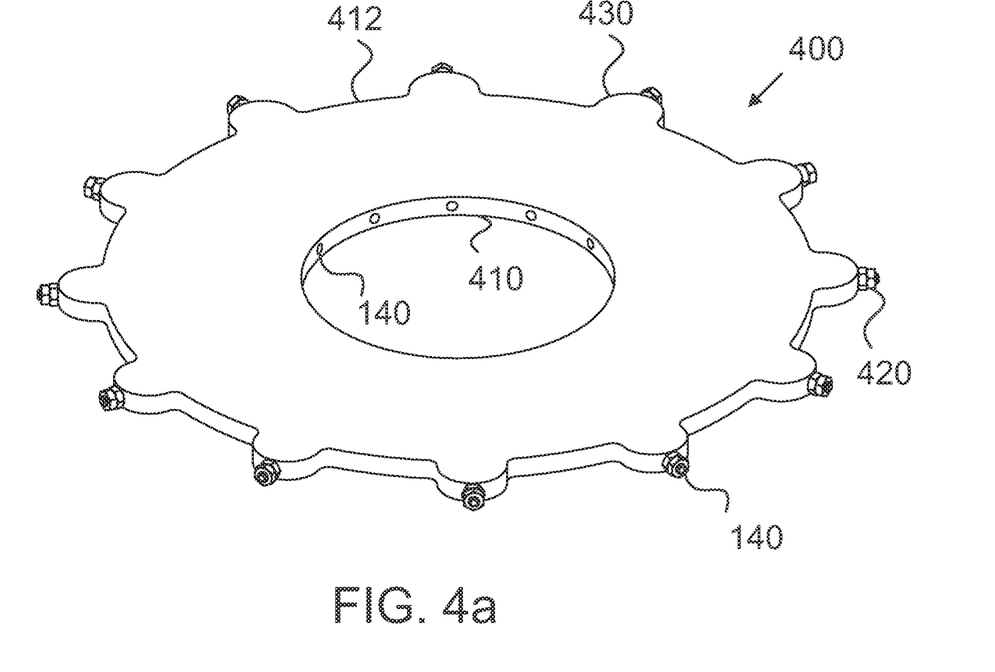
FIGS. 4a and 4b illustrate a gasket of a hydrocyclone according to an embodiment.
Figure 4B:
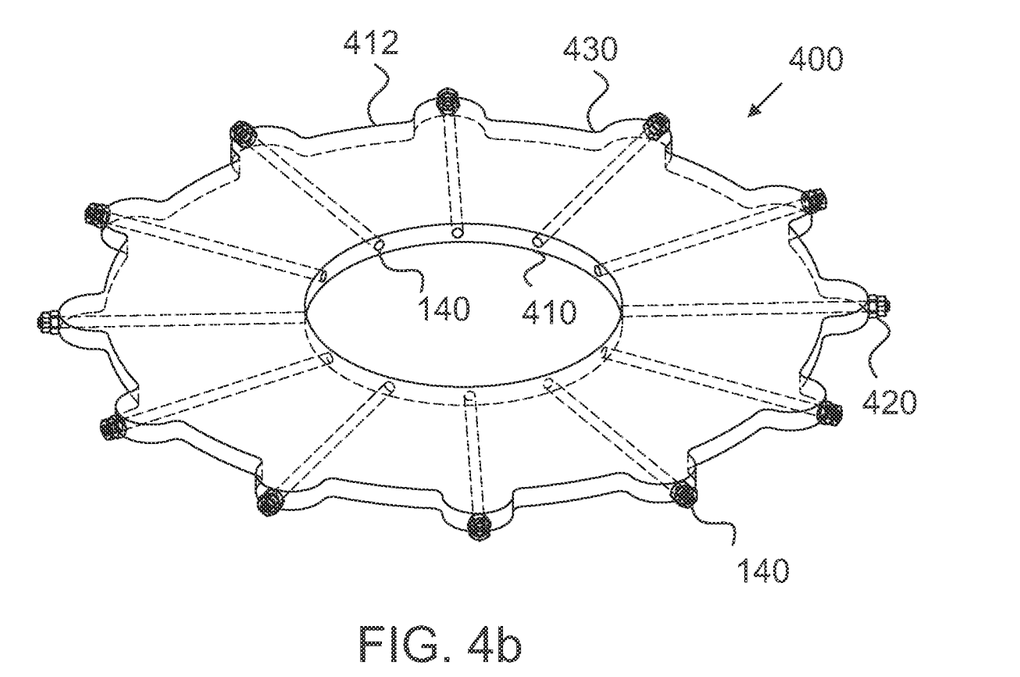

FIGS. 4a and 4b illustrate an example of a gasket 400 for protecting a plurality of electrodes 140, e.g. by mechanical and/or electrical insulation. While FIG. 4a illustrates the example in a perspective view, FIG. 4b illustrates the same example in a perspective view, where the outlines of the plurality of electrodes 140 within the gasket 400 are illustrated with dashed lines.

The gasket 400 may be resilient for providing a sealing contact. The gasket 400 may be of insulating material, for example of rubber or polyurethane. The gasket 400 may be flat. It may be adapted to be positioned horizontally. The gasket 400 may be annular. It has an inner boundary 410 adapted to make contact with the feed after it has been introduced into the cyclone 100 and an outer boundary 412, which may be adapted to face outwards from the lower portion 150. The inner boundary 410 and/or the outer boundary 412 may be annular. The gasket 400 may be adapted to enclose, at least partially, a plurality of electrodes 140. The gasket 400 may have one or more holes for the plurality of electrodes 140. The one or more holes may extend through the gasket 400, e.g. from the inner surface 410 to the outer surface 412. The gasket 400 may be adapted for the plurality of electrodes 140 to be electrically insulated with respect to each other. The gasket 400 may be adapted for the plurality of electrodes 140 to be electrically insulated with respect to the conical section 120 and/or the lower section 150. The plurality of electrodes 140 may be fastened to the gasket 400 by one or more fasteners 420 such as nuts. The thickness of the gasket 400 may be such that each electrode of the plurality of electrodes 140 is insulated by at least a 0.5-1.0 millimeter thick layer of the gasket 400 on each side. The outer boundary 412 of the gasket 400 may comprise one or more extensions 430 for protecting the plurality of electrodes 140. Notwithstanding potential contact points, this allows the electrodes 140 to be enclosed within the gasket 400 substantially along their whole length. The one or more extensions 430 may be adapted to be positioned in the intermediate spaces between the one or more fasteners 320 of a clamp 300. This allows the clamp 300 to be vertically fastened while the ends of the electrodes 140 in the plurality of electrodes 140 remain open for contact on the outer boundary 152 of the lower portion 150 of the cyclone 100. In other words, the clamp 300 may comprise one or more openings for the one or more extensions 430, which are adapted to bypass the clamp 300 through the openings. This allows the electrodes 140 to be mechanically protected, for example from water and dirt, while still providing them available for contact, e.g. from the ends of the electrodes 140. In addition to the above, the one or more extensions 430 may be adapted to indicate correct positioning of the gasket 400, and thereby the electrodes 140.

The different functions discussed herein may be performed in a different order and/or concurrently with each other.

Any range or device value given herein may be extended or altered without losing the effect sought, unless indicated otherwise. Also any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item may refer to one or more of those items.

The term 'comprising' is used herein to mean including the method, blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A hydrocyclone for separating feed into overflow and underflow, comprising:
 (i) a feed inlet;
 (ii) an overflow outlet;
 (iii) an apex for discharging underflow;
 (iv) an upper section connected to the feed inlet and the overflow outlet;
 (v) a conical section between the upper section and the apex, the conical section is divided in separate upper part and lower part in an axial dimension; and
 (vi) a plurality of electrodes for measuring electrical conductivity inside the hydrocyclone to detect the formation of a roping state in the hydrocyclone;
 wherein the plurality of electrodes is positioned circumferentially in the conical section on an axial distance from the apex ($d_{meas}$); wherein $d_{meas}$ is at least 5 percent of the axial distance between the apex and the upper section, and $d_{meas}$ is at most 50 percent of the axial distance between the apex and the upper section; and
 wherein the plurality of electrodes is positioned substantially horizontally, perpendicular to the axial dimension, within an annular gasket, the annular gasket is located between the upper part and the lower part of the conical section.

2. The hydrocyclone according to claim 1, wherein the plurality of electrodes comprises at least nine electrodes for electrical resistance tomography (ERT) and/or electrical impedance tomography (EIT) mapping.

3. The hydrocyclone according to claim 1, wherein a thickness of the electrodes in the plurality of electrodes is at least 2.5 millimeters.

4. The hydrocyclone according to claim 1, wherein the annular gasket is of rubber or insulating polymer.

5. The hydrocyclone according to claim 1, wherein the annular gasket is clamped between the upper part and the lower part.

6. The hydrocyclone according to claim 1, wherein a thickness of the annular gasket is at least 5 millimeters.

7. The hydrocyclone according to claim 1, wherein an outer circumference of the annular gasket comprises an extension for each of the electrodes in the plurality of electrodes.

8. A method for measuring electrical conductivity within a hydrocyclone to detect the formation of a roping state in the hydrocyclone by using the hydrocyclone recited in claim 1,
 wherein the method comprises utilizing the plurality of electrodes positioned within the annular gasket to measure electrical conductivity inside the hydrocyclone to detect the formation of the roping state in the hydrocyclone.

9. The method according to claim 8, wherein a weight of solid matter in the feed introduced into the hydrocyclone corresponds to 10-85 percent of the total weight of the feed.

10. The method according to claim 8, wherein solid matter in the feed introduced into the hydrocyclone has specific weight of 1.5-7.0 tons per cubic meter.

11. The method according to claim 9, wherein solid matter in the feed introduced into the hydrocyclone has specific weight of 1.5-7.0 tons per cubic meter.

* * * * *